Figure 1:
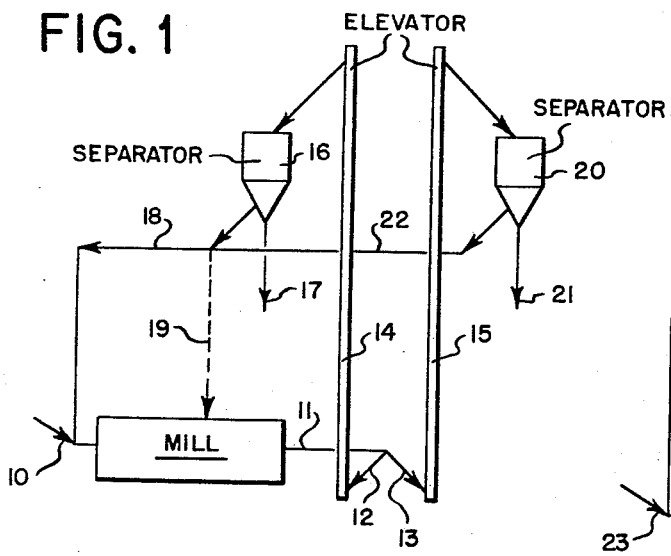

June 6, 1967 T. HEILMANN 3,323,727
MANUFACTURE OF CEMENT
Filed June 24, 1964

INVENTOR
Thorbjorn Heilmann
BY
Pennie Edmonds Morton Taylor Adams
ATTORNEYS

United States Patent Office 3,323,727
Patented June 6, 1967

3,323,727
MANUFACTURE OF CEMENT
Thorbjorn Heilmann, Copenhagen-Valby, Denmark, assignor to F. L. Smidth & Co., New York, N.Y., a corporation of Delaware
Filed June 24, 1964, Ser. No. 377,545
Claims priority, application Great Britain, July 1, 1963, 26,052/63
6 Claims. (Cl. 241—19)

This invention relates to the production of hydraulic cement from cement clinker, especially very high strength and high early-strength cements, and similar finely ground cements, and is concerned more particularly with a novel method of grinding cement clinker for the production of hydraulic cement which avoids the difficulties especially encountered in making very high early-strength cement by present grinding methods.

It is well known that cement of very high strength, especially high early strength, can be made by grinding of cement clinker sufficiently fine, and finely ground Portland cement or high early-strength cement is ground to a fineness corresponding to a specific surface of about 5,000 cm.$^2$/g. measured according to the Blaine method.

It is also well known that in a fine grinding operation the very fine particles of cement have a tendency to create coating or clogging phenomena in the mill and that this tendency can be largely overcome partly by cooling the exterior or the interior of the mill, since the tendency of the particles to produce coatings increases with rising grinding temperature, and partly by the use of dispersing agents, also termed grinding aids.

A further means to counteract the coating tendency is the use of closed-circuit grinding as distinguished from straight grinding. While straight grinding involves a single passage of the clinker through a mill under appropriate operating conditions, closed-circuit grinding is characterized in that the mill is arranged in circuit with a separator producing a fine fraction, which forms the cement of the desired fineness, and a coarse fraction, which is returned to the mill for further grinding. The coating tendency is less in a closed circuit grinding system than in a straight grinding system because with the use of the former the retention time of the finely ground particles which are responsible for the coating problem is considerably shorter than with the use of the latter.

The present invention is directed to the provision of a still further supplementary means for counteracting the coating tendency and consists in grinding cement clinker to produce a ground product, separating the ground product into three fractions having different degrees of fineness, two of these fractions constituting finely ground final products having a difference in fineness corresponding to a specific surface of at least 1,000 cm.$^2$/g., the third fraction, which is a coarse fraction and forms the remainder of the ground product, being returned for further grinding with clinker.

While by the use of present grinding methods it has been possible to grind cement to a finess corresponding to a specific surface of about 5,000 cm.$^2$/g. as mentioned above the method of the invention allows for the production of cement of still greater fineness. Such a cement, which may be referred to as "ultrafine cement," is of a fineness corresponding to a specific surface of no less than about 6,000 to about 9,000 cm.$^2$/g. and enables a further utilization of its potential strength qualities, particularly with regard to obtaining high early strengths of the cement.

In the practice of the method of the invention as applied to the production of ultrafine cements the two finely ground final products are the ultrafine cement and a fine cement, the latter being preferably of normal fineness, that is, of the fineness of Portland or high early-strength cement. The separation of the ground product into the fractions described may, if desired, be carried out in a single separator, to which the entire mill output is delivered and from which the three fractions mentioned are discharged. Preferably, two separators are used, one of which is adjusted to produce an ultrafine cement as the fine fraction while the other is adjusted to discharge fine cement as the fine fraction. The coarse fraction from the second separator and at least a part of the coarse fraction from the first separator are returned to the mill for further grinding. Preferably, the ultrafine cement is of a fineness corresponding to a specific surface in the range of about 6,000 to 9,000 cm.$^2$/g. and the fine cement is of a fineness corresponding to a specific surface of about 3,000 to about 5,000 cm.$^2$/g.

The coarse fraction returned for further grinding may be introduced with the clinker at the inlet end of the mill or may be introduced in the mill so as to pass through only part of the latter. When the return fraction passes through only part of the mill, the first part of the mill receiving the clinker contains no material too fine to be subjected to further grinding in it. Regardless of where the coarse fraction is introduced into the mill, the mill discharge is at the end opposite the inlet although, if desired, the mill may be of the type which has a solid partition at about its middle and is fed from both ends with a central discharge at each side of the partition.

The method of the invention may be carried out in typical ways as illustrated in the drawings, in which FIGS. 1 to 4, inclusive, are flow sheets in which the apparatus used is illustrated diagrammatically.

In the practice of the method as illustrated in FIG. 1, the usual mixture of cement clinker and gypsum is fed into the mill at the point 10 and the ground product leaves the mill in a stream 11, which is divided into streams 12, 13 passing to respective elevators 14, 15. From the top of the elevator 14, the elevated ground product is passed to a separator 16 adjusted to discharge a fine fraction at the point 17. The fine fraction may be of the fineness of ordinary Portland cement or high early-strength cement. A coarse fraction is discharged from the separator and is passed by any suitable means along a path 18 to the point 10 where it is combined with the clinker and gypsum about to enter the mill. As an alternative, the coarse fraction from the separator 16 may travel along the path 19 and enter the mill at a point between its ends. The part of the ground product entering the elevator 15 is delivered to the separator 20, which is adjusted to discharge an ultrafine fraction at the point 21 and a coarse fraction, which travels along a path 22 to be combined with the coarse fraction issuing from separator 16.

With the apparatus arranged as illustrated in FIG. 1, the mill does not grind all of the input to ultrafineness and difficulties arising from coating of the grinding bodies and the interior surface of the mill are largely avoided. Only a part of the mill output constitutes the ultrafine cement while the remainder is fine cement and a coarse fraction returned to the mill.

Figure 2:
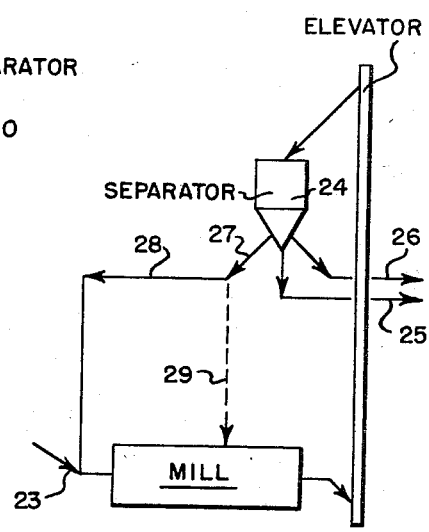

In the arrangement of apparatus shown in FIG. 2, the cement clinker, together with the usual addition of gypsum, is fed into the mill at the point 23 and the entire mill output enters an elevator and is delivered into a separator 24. The separator is of the type which separates in two stages and it delivers an ultrafine fraction at 25, a fine fraction at 26, and a coarse fraction at 27. The coarse fraction is passed along the path 28 to join the material to be ground at 23 or, alternatively, travels along the path 29 to enter the mill between its ends.

Figure 3:
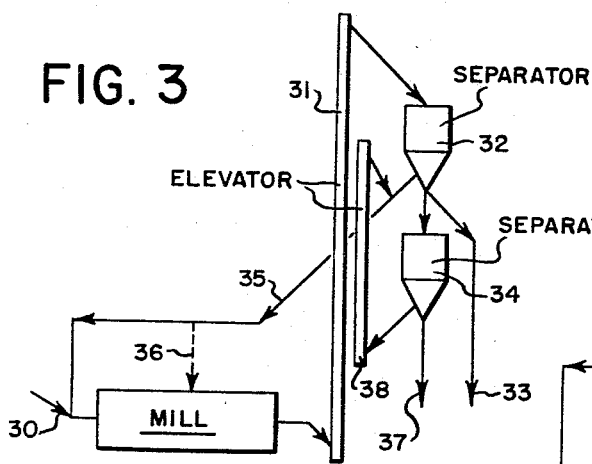

In the arrangement of apparatus shown in FIG. 3, the clinker and gypsum to be ground are supplied to the mill at 30 and the ground product is delivered by an elevator 31 to a separator 32 which produces a fine fraction, part of which is discharged at the point 33, while the remainder passes to a separator 34. The coarse fraction from the separator 32 travels along the path 35 to be combined with the material about to enter the mill at the point 30 or the coarse fraction may travel along the path 36 and be introduced into the mill between its ends. The separator 34 produces an ultrafine fraction discharged at the point 37 and a coarse fraction which enters an elevator 38 and is delivered thereby for combination with the coarse fraction travelling along the path 35.

Figure 4:
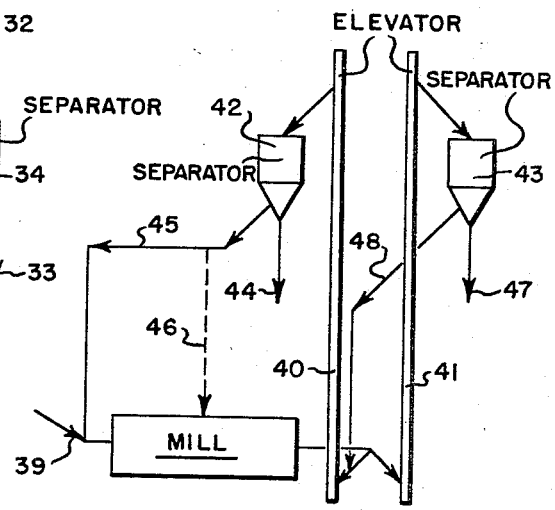

In the apparatus arranged as shown in FIG. 4, the clinker and gypsum to be ground are supplied to the mill at the point 39 and the ground product from the mill is divided into two parts delivered by respective elevators 40, 41 to separators 42, 43. The separator 42 produces a fine fraction discharged at the point 44 and a coarse fraction which travels along the path 45 to be combined with the material about to enter the mill or, alternatively, along the path 46 to enter the mill between its ends. The separator 43 discharges an ultrafine fraction at the point 47 and a coarse fraction which travels along the path 48 to be combined with the part of the ground product entering the elevator 40.

As an example, in one method carried out in an apparatus as illustrated diagrammatically by the flow sheet of FIG. 1, the fractions discharged at the points 17 and 21 were to be a high early-strength Portland cement having Blaine fineness of 4,000 and an ultrafine cement having a fineness of 7,000, respectively. The stream 11 was divided so that 60% was taken to form the stream 12 and 40% to form the stream 13.

The separators 16 and 20 were adjusted to give products of the required fineness, and it was found that 40% of the material supplied to separator 16 and 25% of the material supplied to separator 20 were of the correct fineness. These represent 24% and 10%, respectively, of the stream 11.

The coarse fraction from separator 16 thus represents 36% and the coarse fraction from separator 20 represents 30% of the stream 11, and therefore 66 lbs. of clinker were returned to the mill for further grinding for every 100 lbs. issuing from it, and 34 lbs. of the desired cement products were formed, 24 lbs. being high early-strength Portland cement and 10 lbs. being ultrafine cement.

In all of the arrangements described, the transfer of material from one place to another may be effected by suitable conveying means as, for example, the elevators illustrated may be replaced by pneumatic conveyors, if desired. The particular arrangement of apparatus employed will depend on circumstances but, with all forms of apparatus, it is possible to avoid the difficulties, such as coating, which arise in a single system of closed circuit grinding utilized to produce ultrafine cement only. It is also found that the strength of the ultrafine cement produced by the method of the invention may be higher than that of such cement produced in the ordinary manner by grinding the entire mixture of clinker and gypsum to ultrafineness. The reason for this is that, during grinding, there is a selective action and the parts of the original clinker which are most easily ground and are mainly found in the ultrafine fraction often show the best strength. In a normal closed circuit operation, in which all of the material is ground to ultrafineness, such selective grinding action is less apparent.

I claim:
1. A method of producing hydraulic cement from cement clinker, which comprises grinding clinker to produce a ground product, separating the ground product into three fractions having different degrees of fineness, two of these fractions constituting finely ground final products having a difference in fineness corresponding to a specific surface of at least 1,000 cm.$^2$/g., the third fraction, which is a coarse fraction and forms the remainder of the ground product, and returning the coarse fraction for further grinding with clinker.

2. The method of claim 1, in which one of the fine fractions into which the ground product is separated is an ultrafine cement of a fineness corresponding to a specific surface in the range of about 6,000 cm.$^2$/g. to about 9,000 cm.$^2$/g. and the other fine fraction is a cement of a fineness corresponding to a specific surface in the range of about 3,000 cm.$^2$/g. to about 5,000 cm.$^2$/g.

3. The method of claim 1, in which the ground product is divided into two parts, one part is separated into an ultrafine fraction and a coarse fraction, the other part is separated into a fine fraction and a coarse fraction, and the coarse fractions are returned for further grinding.

4. The method of claim 1, in which the separation of the ground product is carried on in two stages, in one of which an ultrafine fraction and a coarse fraction are produced and in the other of which a fine fraction and a coarse fraction are produced, the coarse fraction produced in one stage is subjected to separation in the other stage and the coarse fraction produced in such other stage is returned for further grinding.

5. The method of claim 1, in which the ground product is divided into two parts, one part is separated into an ultrafine fraction and a coarse fraction, the coarse fraction is combined with the second part of the ground product, the combined coarse fraction and second part are separated into a fine fraction and a coarse fraction, and the latter coarse fraction is returned for further grinding.

6. The method of claim 1, in which the ground product is subjected to separation to produce a fine fraction and a coarse fraction, a part of the fine fraction is discharged and the remainder is separated to produce an ultrafine fraction and a coarse fraction, and the coarse fractions from the separating operations are returned for further grinding.

References Cited

UNITED STATES PATENTS

| | | | |
|---|---|---|---|
| 1,002,504 | 9/1911 | Edison | 241—24 |
| 1,784,462 | 12/1930 | Miller | 241—19 |
| 2,310,005 | 2/1943 | Wilson | 241—19 |
| 2,318,306 | 5/1943 | Hanna | 241—19 |
| 2,595,117 | 4/1952 | Ahlmann | 241—19 X |
| 2,935,267 | 5/1960 | Maxey | 241—19 X |

WILLIAM W. DYER, JR., *Primary Examiner.*

H. F. PEPPER, JR., *Assistant Examiner.*